United States Patent
Boss et al.

(10) Patent No.: US 8,928,776 B2
(45) Date of Patent: Jan. 6, 2015

(54) CAMERA RESOLUTION MODIFICATION BASED ON INTENDED PRINTING LOCATION

(71) Applicant: International Business Machines Corporation, Armonk, NY (US)

(72) Inventors: Gregory Jensen Boss, Saginaw, MI (US); Andrew R. Jones, Round Rock, TX (US); Charles Steven Lingafelt, Durham, NC (US); Kevin C. McConnell, Austin, TX (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 13/683,952

(22) Filed: Nov. 21, 2012

(65) Prior Publication Data
US 2014/0139703 A1    May 22, 2014

(51) Int. Cl.
| | |
|---|---|
| H04N 5/76 | (2006.01) |
| H04N 5/765 | (2006.01) |
| H04N 5/77 | (2006.01) |
| H04N 21/00 | (2011.01) |

(52) U.S. Cl.
CPC ............... *H04N 5/765* (2013.01); *H04N 5/76* (2013.01); *H04N 5/772* (2013.01); *H04N 21/00* (2013.01)
USPC .................................... 348/231.99

(58) Field of Classification Search
CPC .................................. H04N 5/23245
USPC ........................................... 348/231.99, 231.2
See application file for complete search history.

(56) References Cited

U.S. PATENT DOCUMENTS

| | | | |
|---|---|---|---|
| 6,759,641 B1 * | 7/2004 | Loose | 250/208.1 |
| 6,909,889 B2 | 6/2005 | Ishikawa | |
| 7,231,359 B2 | 6/2007 | Parulski | |
| 7,265,868 B2 | 9/2007 | Takahashi | |
| 7,298,524 B2 | 11/2007 | Shibata et al. | |
| 7,423,683 B2 | 9/2008 | Inoue et al. | |
| 7,990,456 B2 | 8/2011 | Inoue | |
| 8,305,452 B2 * | 11/2012 | Fredlund et al. | 348/207.1 |
| 2005/0105136 A1 | 5/2005 | Jung | |
| 2006/0055808 A1 | 3/2006 | Maeng et al. | |
| 2007/0058947 A1 | 3/2007 | Yoshida | |
| 2007/0282908 A1 * | 12/2007 | Van der Meulen et al. | 707/104.1 |
| 2010/0217834 A1 * | 8/2010 | Woodcock et al. | 709/218 |
| 2013/0120592 A1 * | 5/2013 | Bednarczyk et al. | 348/207.1 |

FOREIGN PATENT DOCUMENTS

| | | |
|---|---|---|
| JP | 2004186948 | 7/2004 |
| JP | 2004297509 | 10/2004 |

* cited by examiner

*Primary Examiner* — James Hannett
(74) *Attorney, Agent, or Firm* — Cahn & Samuels, LLP

(57) ABSTRACT

An embodiment of the invention provides a method for determining picture resolution to optimize storage, wherein input is received from a user interface. The input includes a selected picture destination, such as a printer, a photograph processing service provider, a web application, a website, and/or a display. Attributes of the picture destination are determined with a processor, wherein the attributes of the picture destination include a print resolution, a print size, a screen resolution, and/or a image size. The processor determines the picture resolution based on the attributes of the picture destination.

24 Claims, 5 Drawing Sheets

CAMERA RESOLUTION MODIFICATION BASED ON INTENDED PRINTING LOCATION

BACKGROUND

The present invention is in the field of methods, systems, devices, and computer program products for camera resolution modification based on the intended printing location.

Digital photography has all but eclipsed tradition film based cameras in the consumer market and also in the professional market. With digital photography, cameras are able to take photos in various different resolutions. A typical camera may offer the user the choice of a low, medium or high resolution and often specify those in actual pixel depth.

SUMMARY OF THE INVENTION

An embodiment of the invention provides a method for determining picture resolution to optimize storage, wherein input is received from a user interface. The input includes a selected picture destination, such as a printer, a photograph processing service provider, a web application, a website, and/or a display. Attributes of the picture destination are determined with a processor, wherein the attributes of the picture destination include a print resolution, a print size, a screen resolution, and/or a image size. The processor determines the picture resolution based on the attributes of the picture destination.

Another embodiment of the invention provides a device having a user interface that receives a selected picture destination, wherein the selected picture destination is a printer, a photograph processing service provider, a photograph sharing web application, a website, and/or a display. A processor connected to the user interface determines attributes of the picture destination and determines a picture resolution based on the attributes of the picture destination. The attributes of the picture destination include a print resolution, a print size, a screen resolution, and/or a image size. The device further includes a storage device connected to the processor, wherein the storage device includes the attributes of the picture destination. A communications module is also connected to the processor, wherein the communications module queries a webpage and/or an online database to determine the attributes of the picture destination.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
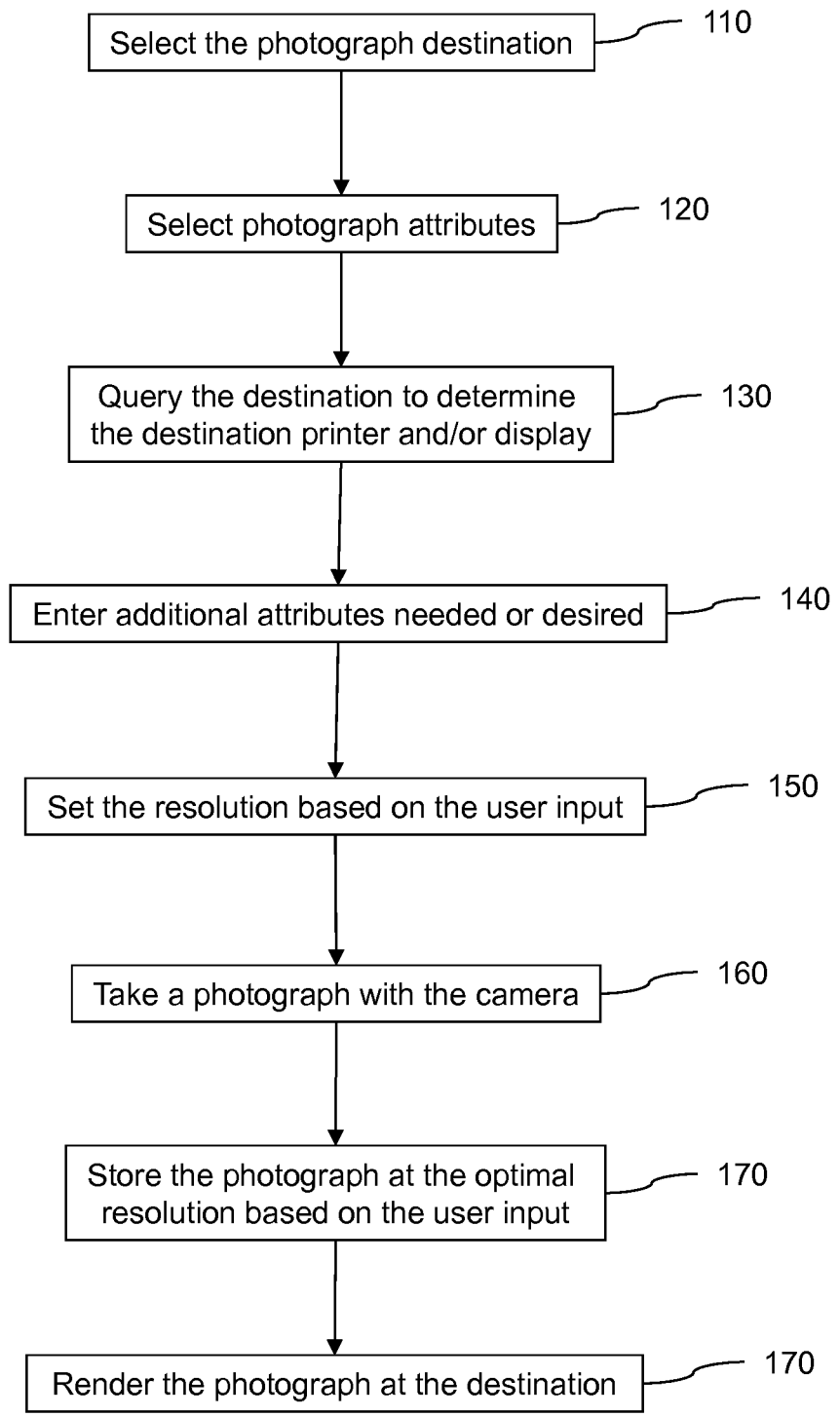
FIG. 1 is a flow diagram illustrating a method to modify camera resolution depth based on the intended printing location according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method and system for optimizing the resolution of a picture (also referred to herein as a "photograph" or "image") prior to the taking of the picture. More specifically, the camera accepts as input from the user attributes of the intended picture, including destination and/or size. The camera can communicate with the destination services to determine what its printing capability is and then modify the camera's settings to an optimal resolution.

A camera system (also referred to herein as "the camera") according to an embodiment of the invention collects information from the user prior to taking a picture and uses this information to automatically adjust the camera resolution to an optimal value. The users can select specific attributes or a general profile or category. For example, the specific attributes can include the size of a printed photograph or digital image, the quality the printed photograph or digital image, the destination printer (e.g., home printer, photolab printer), and/or the destination for display (e.g., digital picture frame, social networking website). The general profile or category (also referred to herein as an "album") can include, for example, vacation, yearbook, online social network, yearly family photo, etc.

The camera system can query in real time or use a cached information store to determine what printer the destination service (also referred to herein as the "picture destination") uses. In the case of displaying a photograph, the camera system can query in real time or use a cached information store to determine the ideal format of the picture elements (e.g., for services such as a social networking website album). The camera system method can then determine the intended size of the photograph in conjunction with the printer's and/or display's resolution capabilities and adjust the cameras resolution to an optimal value. The collection of information from the user prior to taking the picture can be performed immediately prior to the taking of the picture or the information can be set as part of a default profile well in advance of the taking the picture.

The following provides an example implementation of a method to modify camera resolution depth based on the intended printing location according to an embodiment of the invention. Tom sees his kids playing at the park and he decides to snap a few photographs which he plans on uploading to XYZ social networking website. Tom pulls out his smart phone with built-in camera, selects the XYZ social networking website profile, and then snaps five photographs. When the XYZ social networking website profile was chosen, the camera queried the XYZ social networking website and determined that a low resolution was optimal for the intended destination and changed the settings before Tom took the first shot. Tom's spouse commented on how perfect a shot of the family would be with the sunset for their annual scrapbook so Tom selects "3×5 Scrapbook" on his phone. This causes the camera to use GPS to determine the location of the nearest ABC Photo Store and queries that location to determine that the location has a digital minilab systems dye sublimation printer with a 400 dpi maximum resolution. This causes the camera to calculate (3 inches×400=1200 pixels by 5 inches× 400 dpi=2000 pixels) and select the 1200×2000 pixel resolution option.

An embodiment of the invention queries an end user for input to collect specific destination attributes (e.g., picture size, number of pixels, pixel depth, color depth, a specific photo lab, online destination, etc.) or a general profile (e.g., scrapbook, framed family photo, post card, etc.). The destination can be interrogated, for example, via a public application program interface (API) or database, to determine the printer the destination uses and the maximum resolution the printer can take as an input. The destination can be a physical location (e.g., a photographic processing store) and/or a virtual location (e.g., a cloud based on-line photograph sharing website). An optimal camera resolution can be calculated based on the input. In another embodiment, the user selects a high pixel count for the photograph to obtain the highest resolution for the camera.

FIG. 1 is a flow diagram illustrating a method to modify camera resolution depth based on the intended printing location according to an embodiment of the invention. A user selects the photograph destination on his or her camera 110. The destination can include, for example, XYZ Store 1-hour photo, home ink jet printer, ABC online photo sharing website. In this example, the user selects XYZ Store 1-hour photo. The user can also select photograph attributes 120, such as, for example, a desired print size of 4×6, 5×7, or 8×10. In example, the user selects the 5×7 print size.

The camera queries the destination to determine the destination printer and/or display 130. In this example, the camera queries the XYZ Store 1-hour photo website and determines that they have a 400 dpi dysublimation printer. The user can enter additional attributes needed or desired 140. For example, a destination can have multiple rendering methods and the user can select one or more of the methods. For example, the destination offers prints on t-shirts, mouse pads, coffee mugs, and photo paper, which can be displayed to the user on the camera.

The camera sets the resolution based on the user input 150 (e.g., (400 dpi×7 inches=2800 pixels width)×(400 dpi×5 inches=2000 height)); and, the user takes a picture 160. The camera stores the photograph at the optimal resolution based on the user input 170 (e.g., 2800×2000 resolution depth). The user renders the photograph at the destination 180 (e.g., hard copy prints at XYZ Store 1-hour photo).

Figure 2:
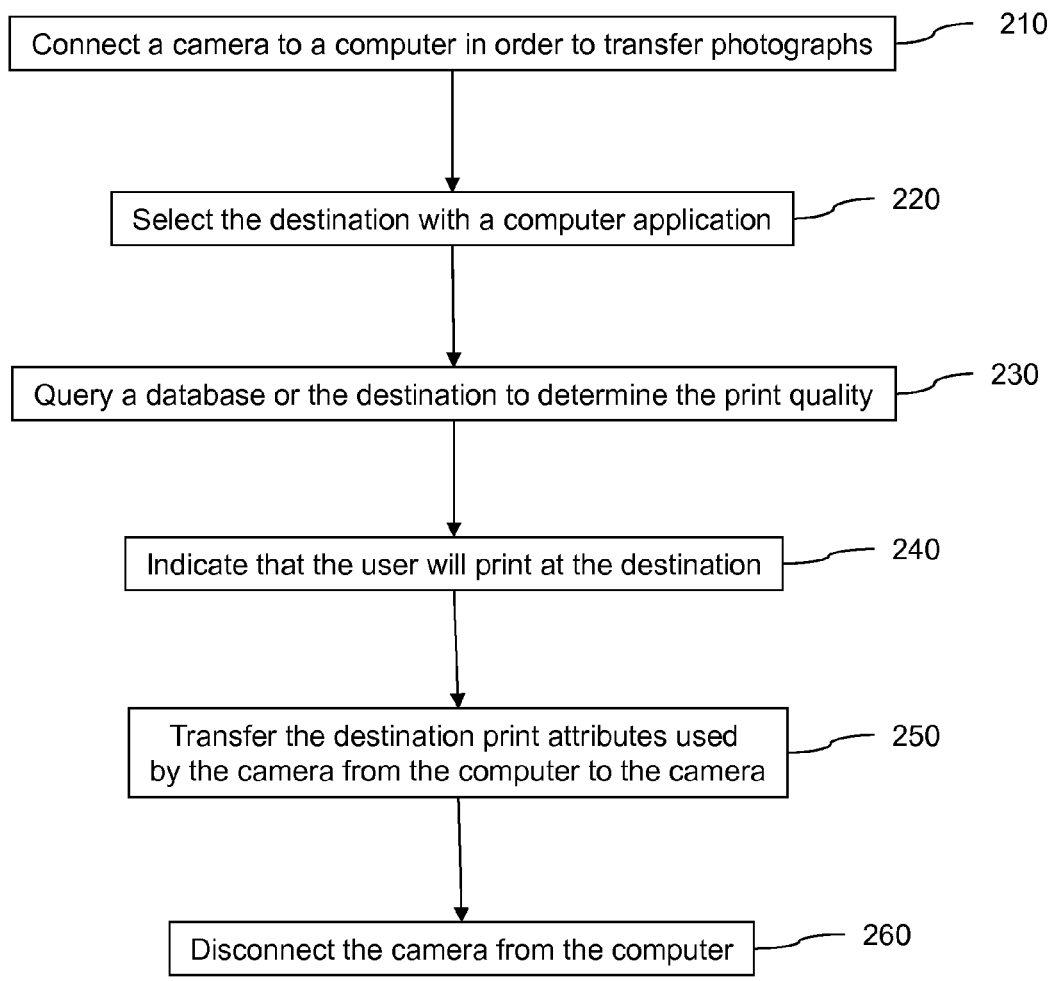
FIG. 2 is a flow diagram illustrating a method to modify camera resolution depth based on the intended printing location according to another embodiment of the invention.

FIG. 2 is a flow diagram illustrating a method to modify camera resolution depth based on the intended printing location according to another embodiment of the invention, wherein the selection of the print location is performed much prior to picture taking The camera is connected to a computer in order to transfer photographs 210. The user interacts with a computer application to select the destination 220. The computer application queries a database or the destination itself in order to determine the appropriate print quality 230. The user indicates that, by default, he or she will print at this destination 240. The destination print attributes used by the camera to set the optimal resolution is transferred from the computer to the camera and the destination print attributes are set as the camera's default setting 250. The camera is disconnected from the computer 260. If the user goes on vacation and takes a lot of pictures, the camera does not need to connect to the destination or a database to determine the optimal picture resolution.

In at least one embodiment of the invention, the camera can store information for multiple destinations and the user can select a destination at the time of picture taking The camera can have a default setting that is used when the user does not explicitly choose a single destination from a set of saved destinations.

Figure 3:
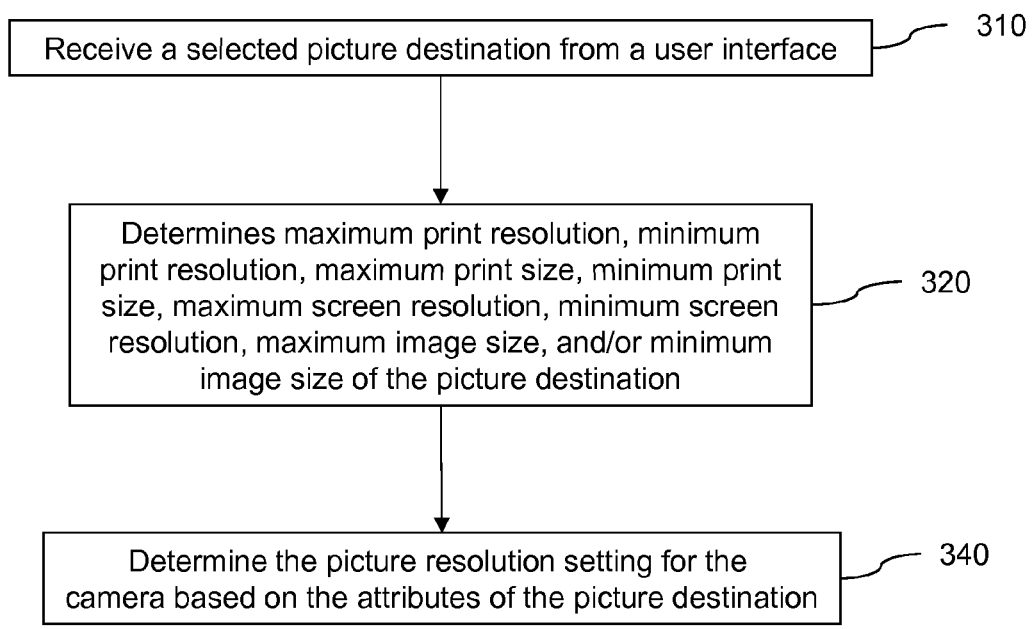
FIG. 3 is a flow diagram illustrating a method for determining a picture resolution to optimize storage according to an embodiment of the invention.

FIG. 3 is a flow diagram illustrating a method for determining a picture resolution to optimize storage according to an embodiment of the invention. Input is received from a user interface 310, where the input includes a picture destination selected by the user (also referred to herein as the "selected picture destination" or "picture destination"). The picture destination can include a printer, a photograph processing store, a photograph sharing web application (e.g., WWW.FLICKR.COM, WWW.SNAPFISH.COM, WWW.SHUTTERFLY.COM), a social networking website (e.g., WWW.FACEBOOK.COM, WWW.MYSPACE.COM), and/or a monitor (e.g., digital photo frame, mobile phone display, tablet computer, laptop computer monitor, desktop computer monitor). The user interface can include a touchscreen display, a rollerball, arrow keys (e.g., 4-way controller), a keypad, and/or a microphone. For example, the user enters the destination "XYZ Store 1-hour photo" from a touchscreen display on the user's camera. In at least one embodiment, the user is prompted by the camera to enter and/or select the picture destination prior to capturing the photograph. In at least one embodiment, the input (i.e., selected picture destination) is stored in a storage device of the digital camera (can be different from where pics stored) and set as the default picture destination.

A processor determines attributes of the picture destination 320, where the attributes of the picture destination can include maximum print resolution, minimum print resolution, maximum print size, minimum print size, maximum screen resolution, minimum screen resolution, maximum image size, and/or minimum image size. Specifically, the processor queries a storage device that includes the maximum print resolution, the maximum print size, the maximum screen resolution, and/or the maximum image size at the picture destination. In at least one embodiment, the storage device includes internal camera memory, which can be separate from the memory device where photographs are stored. In another embodiment, the storage device is an external resource (e.g., the picture destination's website) that the processor connects to via a communications module of the camera (e.g., WiFi Internet connection, 4G telecommunications). For example, the processor queries an online database to determine that the XYZ Store 1-hour photo lab has a maximum print resolution of 1280×1024.

In at least one embodiment of the invention, the selected picture destination is an digital and/or print album, such as, for example, scrapbook, vacation, yearbook, family, and postcards. The album can include the maximum print resolution for the album, the minimum print resolution for the album, the maximum print size for the album, the minimum print size for the album, the maximum screen resolution for the album, the minimum screen resolution for the album, the maximum image size for the album, and/or the minimum image size for the album.

The processor determines the picture resolution setting for the camera (for the photograph to be captured) based on the attributes of the picture destination 330. Specifically, the processor can select a picture resolution that is equal to or less than the maximum printer/screen resolution and/or the maximum print/image size of the picture destination.

Figure 4:
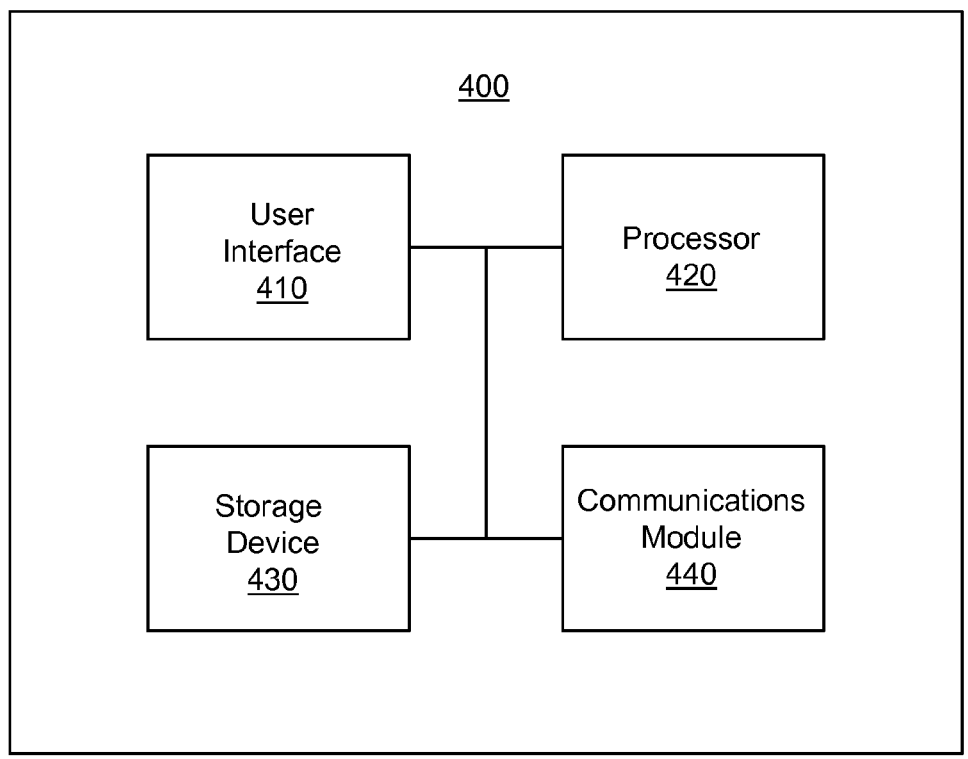
FIG. 4 illustrates a system for determining a picture resolution to optimize storage according to an embodiment of the invention.

FIG. 4 illustrates a device 400 for determining a picture resolution to optimize storage according to an embodiment of the invention. The device 400 (also referred to herein as the "digital camera") includes a user interface 410 (e.g., GUI) that receives a selected picture destination (also referred to herein as the "picture rendering destination"). The picture destination can include a printer, a photograph processing service provider, a photograph sharing web application, a website, and/or a display. For those skilled in the art, it can be observed that other rendering destinations not explicitly named are also contemplated by the embodiments of the invention. In at least one embodiment, the picture destination includes a selected album, wherein the album includes a pre-set print resolution for the album, a pre-set print size for the album, a pre-set screen resolution for the album, and/or a pre-set image size for the album. The user interface 410 can prompt the user for the selected picture destination prior to capturing a photograph, for example, via a visual and/or audio alert or message.

The system 400 includes a processor 420 that determines attributes of the picture destination, where the attributes of the picture destination include a print resolution, a print size, a screen resolution, and/or a image size. As used herein, the term "processor" includes a computer hardware device that is connected to a user interface. As used herein, the term "connected" includes operationally connected, logically connected, in communication with, physically connected, engaged, coupled, contacts, linked, affixed, and attached. The processor 420 also determines the picture resolution based on the attributes of the picture destination. The processor 420 can set the selected picture destination as the default picture destination.

A storage device 430 (also referred to herein as "memory") is connected to the processor 420, where the storage device 430 includes the attributes of the picture destination. A communications module 440 is also connected to the processor 420, where the communications module 440 queries a webpage and/or an external online database to determine the attributes of the picture destination.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
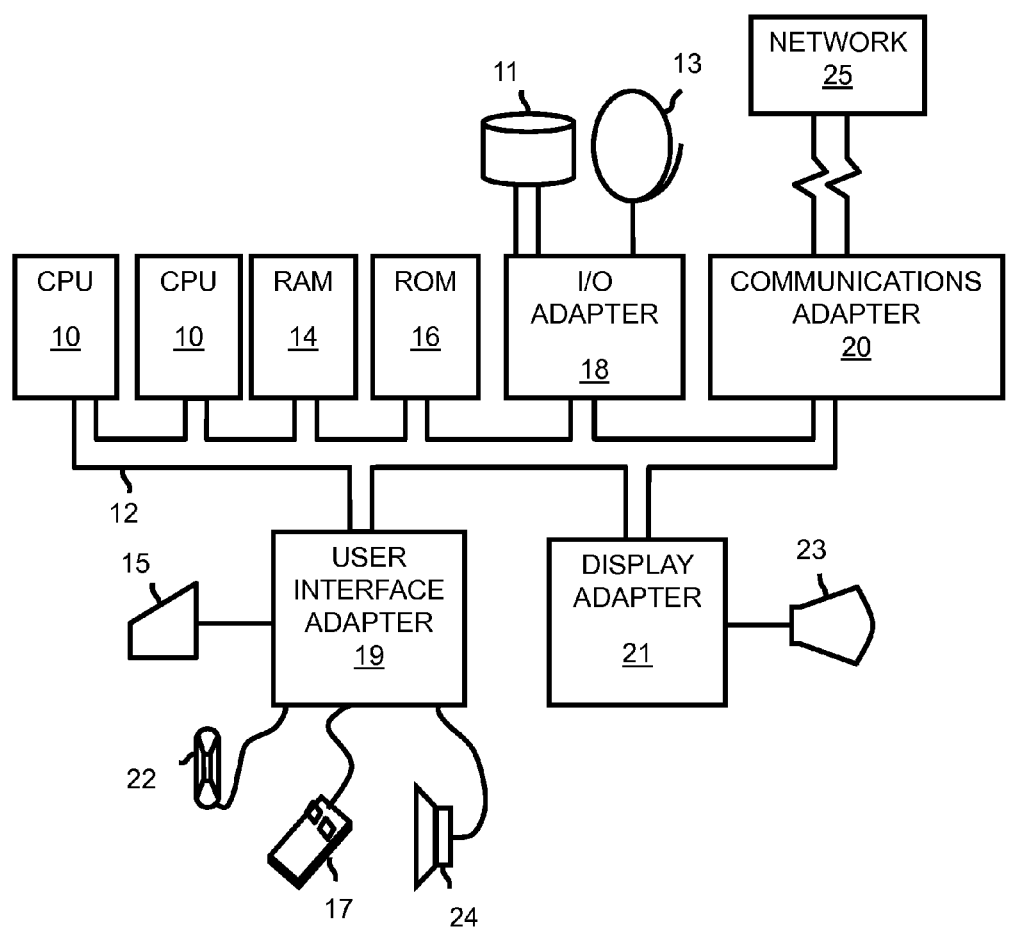
FIG. 5 illustrates a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving input from a user interface including a selected picture destination;
determining attributes of the picture destination with a processor, the attributes of the picture destination including at least one of a print resolution, a print size, a screen resolution, and an image size, wherein said determining of the attributes of the picture destination includes querying a webpage and an online database with a communications module;
determining a picture resolution with the processor based on the attributes of the picture destination;
setting a picture resolution setting of a camera to the picture resolution determined by the processor prior to creation of a first photograph; and
creating the first photograph with the camera, the first photograph being created by the camera in the picture resolution determined by the processor.

2. The method according to claim 1, wherein the picture destination includes a printer.

3. The method according to claim 1, wherein said determining of the attributes of the picture destination includes querying a storage device on a digital camera, the storage device including at least one of the print resolution, the print size, the screen resolution, and the image size at the picture destination.

4. The method according to claim 1, wherein said determining of the attributes of the picture destination includes querying at least one of a webpage and an online database with the communications module.

5. The method according to claim 1, wherein the picture destination includes an album, the album including at least one of a print resolution for the album, a print size for the album, a screen resolution for the album, and an image size for the album.

6. The method according to claim 1, further including prompting the user for the selected picture destination prior to capturing a photograph.

7. The method according to claim 1, further including setting the selected picture destination as a default picture destination.

8. A method for determining a picture resolution to optimize storage, said method comprising:
receiving input from a user interface including a selected picture destination;
determining attributes of the picture destination with a processor,
the picture destination including at least one of a printer, a photograph processing store, a web application, a website, and a display,
the attributes of the picture destination including at least one of a maximum print resolution, a maximum print size, a maximum screen resolution, and a maximum image size,
wherein said determining of the attributes of the picture destination includes querying a webpage and an online database with a communications module;
determining the picture resolution with the processor based on the attributes of the picture destination;
setting a picture resolution setting of a camera to the picture resolution determined by the processor prior to creation of a first photograph; and creating the first photograph with the camera, the first photograph being created by the camera in the picture resolution determined by the processor.

9. The method according to claim 8, wherein said determining of the attributes of the picture destination includes querying a storage device on a digital camera, the storage device including at least one of the maximum print resolution, the maximum print size, the maximum screen resolution, and the maximum image size at the picture destination.

10. The method according to claim 8, wherein said determining of the attributes of the picture destination includes querying at least one of a webpage and an online database with the communications module.

11. The method according to claim 8, wherein the picture destination includes an album, the album including at least one of a maximum print resolution for the album, a maximum print size for the album, a maximum screen resolution for the album, and a maximum image size for the album.

12. The method according to claim 8, further including prompting the user for the selected picture destination prior to capturing a photograph.

13. The method according to claim 12, further including setting the selected picture destination as a default picture destination.

14. A method comprising:
receiving input from a user interface, the input including a selected picture destination;
determining attributes of the picture destination with a processor, the attributes of the picture destination including at least two of a print resolution, a print size, a screen resolution, and an image size, wherein said determining of the attributes of the picture destination includes querying a webpage and an online database with a communications module;
determining a picture resolution with the processor based on the attributes of the picture destination;
setting a picture resolution setting of a camera to the picture resolution determined by the processor prior to creation of a first photograph; and
creating the first photograph with the camera, the first photograph being created by the camera in the picture resolution determined by the processor.

15. The method according to claim 14, wherein the picture destination includes at least two of a printer, a photograph processing service provider, a photograph sharing web application, a social networking website, and a monitor.

16. The method according to claim 14, wherein said determining of the attributes of the picture destination includes querying a storage device on the camera, the storage device including at least two of the print resolution, the print size, the screen resolution, and the image size at the picture destination.

17. The method according to claim 14, wherein the picture destination includes an album, the album including at least two of a print resolution for the album, a print size for the album, a screen resolution for the album, and a image size for the album.

18. The method according to claim 14, further including prompting the user for the selected picture destination prior to capturing a photograph.

19. The method according to claim 14, further including setting the selected picture destination as a default picture destination.

20. A method for determining a picture resolution to optimize storage, said method comprising:
receiving input from a user interface including a selected picture destination;
determining attributes of the picture destination with a photographic processor, the attributes of the picture destination including a print resolution, a print size, a screen resolution, and an image size, wherein said determining of the attributes of the picture destination includes querying a webpage and an online database with a communications module;
determining the picture resolution with the photographic processor based on the attributes of the picture destination;
setting a picture resolution setting of a camera to the picture resolution determined by the processor prior to creation of a first photograph; and
creating the first photograph with the camera, the first photograph being created by the camera in the picture resolution determined by the processor.

21. The method according to claim 20, wherein the picture destination includes a printer, a photograph processing store, a photograph sharing web application, a social networking website, and a monitor.

22. The method according to claim 20, wherein said determining of the attributes of the picture destination includes querying a storage device on the camera, the storage device including the print resolution, the print size, the screen resolution, and the image size at the picture destination.

23. The method according to claim 20, wherein the picture destination includes an album, the album including a print resolution for the album, a print size for the album, a screen resolution for the album, and an image size for the album.

24. The method according to claim 1, wherein the picture destination further includes at least one of a photograph processing store, a photograph sharing web application, a website, and a monitor.

* * * * *